Inventors:
GEORGE RALPH BAKER,
JAMES WASHINGTON EPPS,
GEORGE WILLIAM PERKS.
by their Attorney:

Nov. 26, 1929.     G. R. BAKER ET AL     1,737,447
COATING CONFECTIONERY AND THE LIKE
Filed March 30, 1927     2 Sheets-Sheet 2

Inventors
GEORGE RALPH BAKER,
JAMES WASHINGTON EPPS,
GEORGE WILLIAM PERKS.
by their Attorney:

Patented Nov. 26, 1929

1,737,447

UNITED STATES PATENT OFFICE

GEORGE RALPH BAKER, OF LONDON, AND JAMES WASHINGTON EPPS, OF WARLINGHAM, AND GEORGE WILLIAM PERKS, OF SOUTHPORT, ENGLAND, ASSIGNORS TO BAKER PERKINS COMPANY INCORPORATED, OF NEW YORK, N. Y., A CORPORATION OF NEW YORK

COATING CONFECTIONERY AND THE LIKE

Application filed March 30, 1927, Serial No. 179,662, and in Great Britain March 31, 1926.

This invention relates to the coating of confectionery and the like with chocolate or similar coating substance in which the goods or "centres" to be coated are conveyed in movement through a coating substance (hereinafter for sake of brevity referred to as chocolate) suitably in the form of a descending curtain or stream whereby the said goods are coated, the coating substance being then allowed to set or solidify for instance on a separate band, plaque or equivalent to which the coated confections are transferred, or this setting or solidifying may take place on the same conveyor as that on which they the confections are passed through the stream of coating substance.

The object of the invention is to so apply the chocolate coating to the goods or centres that the resulting goods have a more brilliant gloss or lustre than is produced by previous processes of the above type, and with this object in view, according to the invention, the chocolate issuing as from a mixing, flooding or delivery vessel or other container or equivalent is so delivered that a "grained" or partially crystallized portion thereof is caused to form the outside stratum or surface portion or layer of the coating, the remainder of the coater of the coating being in ungrained condition. This is effected in such a manner that during coating of the goods the latter are caused to pass through the chocolate so that a "grained" surface layer of the latter forms the exterior surface of the finished coated confection, such grained surface layer or stratum controlling the solidification of the chocolate coating so that it takes place from the exterior inwards, thus ensuring a brilliant glossy surface when set.

Five different forms of apparatus for carrying out the method of the invention are illustrated in the accompanying drawings which show diagrammatic sectional views of such forms.

In the drawings Fig. 1 is a diagrammatic view of one form of the improved apparatus partly in section.

The various figures will be specifically referred to in turn in the following detailed description.

Figure 1:
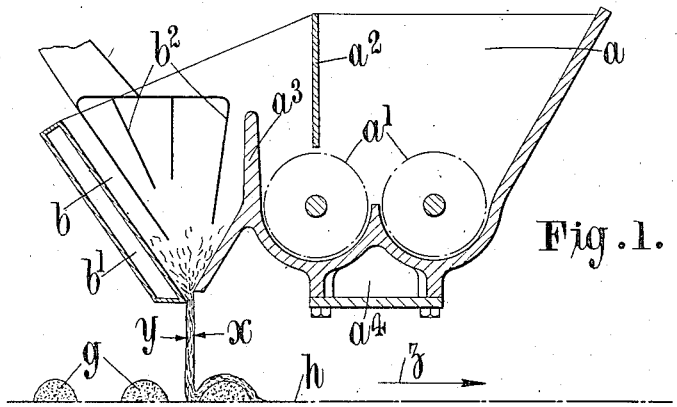

In the method of carrying out the invention shown in Fig. 1 of the drawings the chocolate is contained in a flooding vessel $a$ containing mixing devices $a^1$ and a baffle $a^2$, the outlet from the vessel being in the form of a weir $a^3$ over which the chocolate passes to a delivery vessel $b$ jacketed for a heating medium as at $b^1$ and containing a vibrator in the form of a series of inclined plates $b^2$. This vibrator, however, is not operated violently but, on the contrary, has a slow motion, and does not reach to the bottom of the vessel or even near to it, so that, at any rate near the outlet of said vessel, the chocolate is not disturbed sufficiently to prevent that part which is in contact with the cooled side of the vessel from becoming cooler than the remainder. The curtain or stream of chocolate as it issues from the outlet of the delivery or flooding vessel $b$ is in the form of two distinct or separate surface layers or strata, that is to say, one stratum $x$ is "grained" or in a state of partial crystallization produced by chilling in the flooding vessel as by means of a cooling medium in jacket $a^4$ and the other stratum or portion $y$ is in an ungrained or non-crystallized condition which may be effected by heating or tempering one wall of the delivery vessel $b$ as by means of the medium in jacket $b^1$ or by heating certain of the plates or equivalent $b^2$ over which the chocolate passes from the flooding vessel to the goods. Thus the curtain or stream will issue in surface layers or strata of two different temperatures or of grained and ungrained character. This result can also be produced, if the chocolate is initially all in ungrained condition, by chilling one side of the curtain or stream as hereinafter explained. In either case the goods $g$ are passed, as on a conveyor $h$, through the curtain or stream of chocolate in such direction or manner as indicated by the arrow $z$ that the cooler or grained portion $x$ forms the exterior surface of the coating as above referred to.

Figure 2:
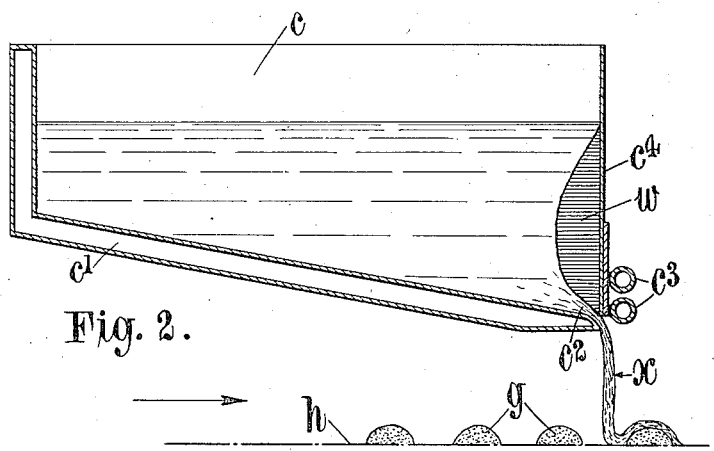
Fig. 2 is a similar view of a modification.

In another method of carrying out the invention shown in Fig. 2, chocolate for the coating operation is used in which the whole of the fat contents is in a molten state, and means are provided to ensure that all the chocolate fed to the flooding mechanism is in such condition. During flooding a surface stratum or layer of the issuing curtain or stream of chocolate which will form the exterior surface of the finished coated confection is chilled so that crystallization is started in this portion.

Flooding mechanism may be used for this method which comprises, a trough or container $c$ suitably jacketed as at $c^1$ or otherwise constructed so that a warm tempering medium or fluid can be circulated around it to prevent chilling or premature setting or graining of the contents, and the molten chocolate, at for example a temperature of 34.5° C. or over, or which may have been tempered down from 34.5° C. to a lower temperature which is sufficiently high to retain it in a molten condition, is caused or permitted to pass from the container, for instance, through a slit or opening $c^2$ therein, but so that the surface stratum or layer $x$ of the issuing curtain of chocolate is grained, this grained stratum, as above mentioned, being that which will form the exterior surface of the finished coated confections passing along below the container in the direction of the arrow.

The graining of the surface stratum of the chocolate curtain may be effected in various ways, a suitable arrangement being the provision of one or more pipes $c^3$ or a jacket or surface attached to or in close proximity to the flooding vessel or container and located adjacent to one side of the discharge slit or opening $c^2$ and through, in or on which pipe, jacket or surface a cooling medium, such as water or cool air, is circulated or applied to cool the wall $c^4$ of the container immediately adjacent one edge of said discharge opening $c^2$. The cooled container wall becomes coated with solidified chocolate as at $w$ and the molten chocolate flowing through the opening has the surface portion, stratum or layer $x$ grained and partially chilled by contact with said solidified chocolate as it passes over the latter. All other parts of the flowing chocolate remain molten since the remaining parts of the container walls are warmed by the medium in jacket $c^1$, or by other suitable means.

Figure 3:
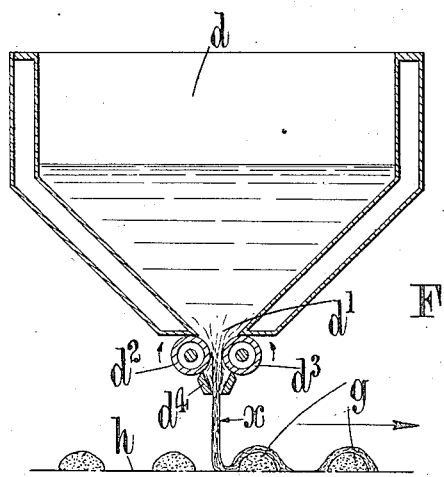
Fig. 3 is a similar view of a further modification.

Another means of chilling the surface stratum or layer of chocolate is shown in Fig. 3 and consists in providing one side of the discharge opening $d^1$ of a jacketed container $d$ with a cooled revolving roller $d^3$, or a pair of rollers $d^2$ $d^3$ may be used as shown, one $d^2$ being warmed and the other $d^3$ cooled as by being made hollow for reception of the respective warming and cooling medium, the flowing curtain of chocolate passing between said rollers as shown so that the grained portion $x$ forms the exterior surface of the coated confection.

The chocolate may be removed from the rollers as by a pair of scrapers shown at $d^4$ suitably arranged to form a funnel.

Figure 4:
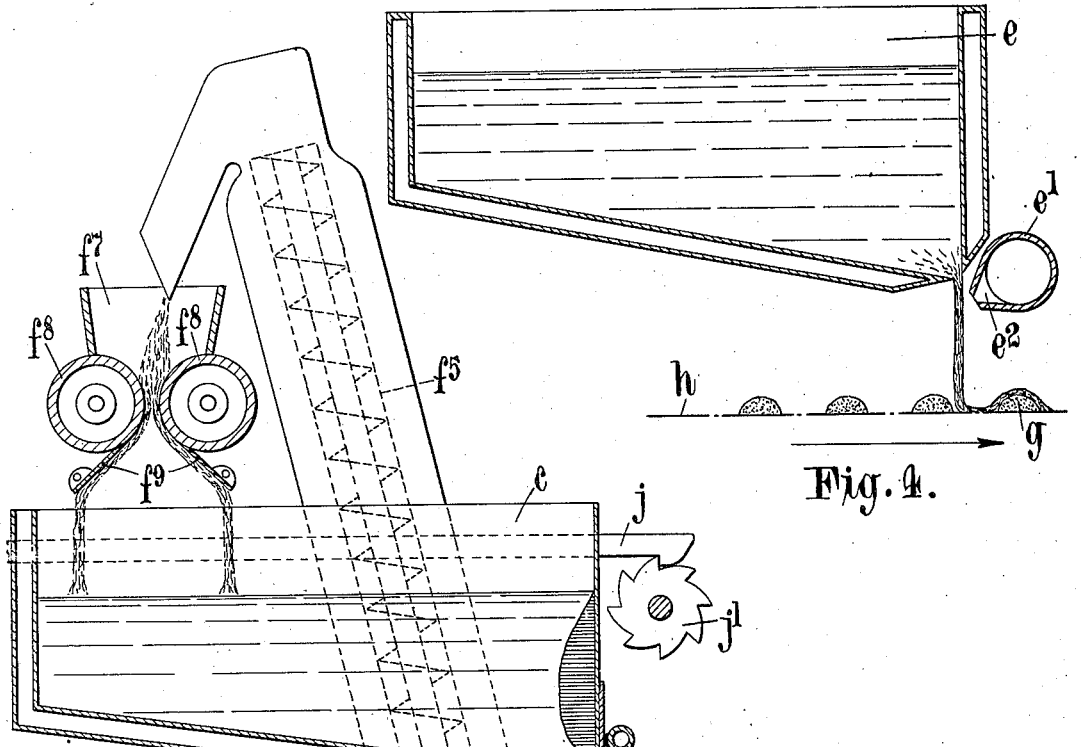
Fig. 4 illustrates in a similar manner a yet further modification.

Another method is illustrated in Fig. 4 wherein, in place of the cooled pipe or jacket adjacent the discharge opening as in Fig. 2, a jet of cool air may be caused to impinge on the surface of the curtain of chocolate flowing from a jacketed container $e$ as by means of a pipe $e^1$ and nozzle $e^2$.

In any or all of the above methods the molten chocolate not picked up by the "centres" $g$ being coated falls through the conveyor $h$ carrying the centers into or onto a heated tray or other container and may be finally elevated, as by pumping, to be again fed to the flooding trough. But before it reaches the latter it is subjected to means whereby the whole of the chocolate is reconditioned, preferably by being heated to a temperature slightly above melting point, for example 34.5° C., and then if desired tempered down to the temperature required for coating goods, but this must be done without graining the chocolate, or in other words the reconditioning operation should degrain the chocolate. The chocolate falling through the conveyor may contain solid or semi-solid lumps such as would fall from roller scrapers or other unheated parts of the mechanism, and all such lumps must be melted.

Figure 5:
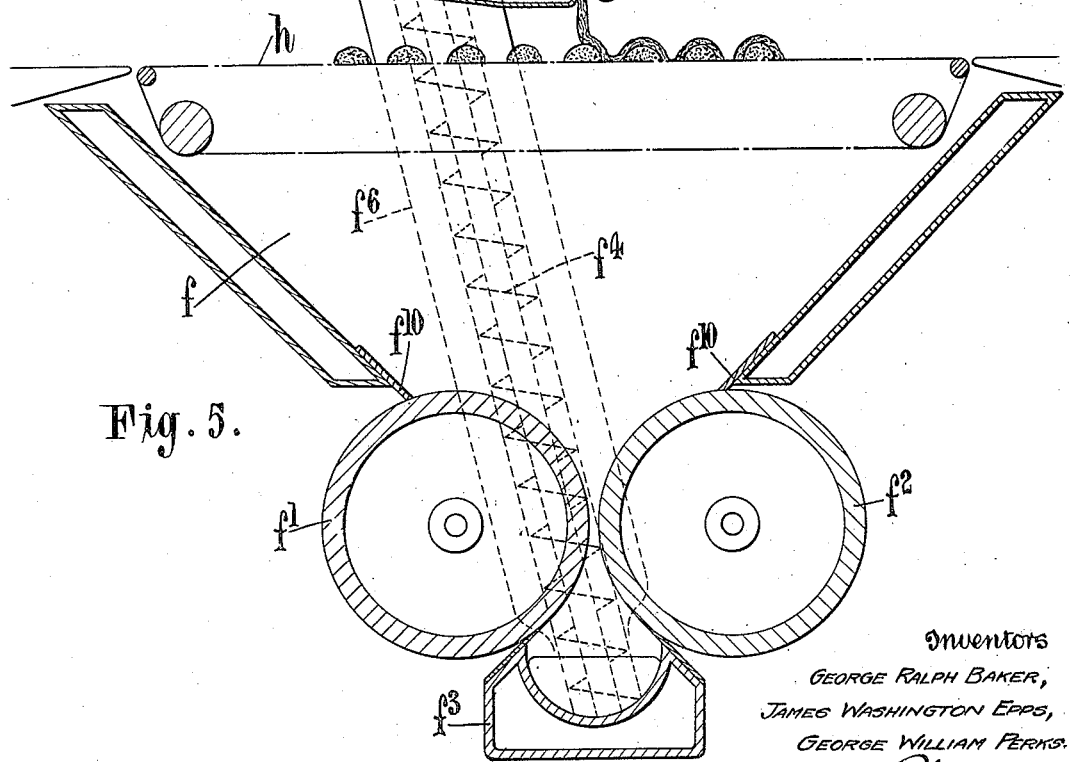
Fig. 5 illustrates in diagrammatic view, partly in section, means for returning and reconditioning the surplus coating material.

This may be effected in various ways but an appropriate method is illustrated in Fig. 5 in which the chocolate is collected below the conveyor $h$ by means of a heated trough $f$ and passes from the latter between a pair of heated, closely set revolving rollers $f^1$ $f^2$ which may, if desired, be rotated at different speeds. Scrapers $f^{10}$ for the rollers are shown as attached to the wall of the trough $f$. The said rollers will press out the lumps and ensure that the whole of the chocolate will pass between them in molten condition. Other ways of attaining the same object are to pass the lumpy chocolate into a heated collecting trough, or to feed or pump it through a strainer which will retain the lumps until the hot chocolate flowing past causes them to melt.

The chocolate from between the rollers $f^1$ $f^2$ passes into a jacketed trough $f^3$ from which it may be elevated by any convenient pumping mechanism, preferably jacketed, to prevent chilling, a preferred or suitable elevating means comprising a revolving worm or screw elevator $f^4$ shown as having an inclined axis and working within a pipe or tube $f^5$ in which the worm fits. The said pipe or tube is suitably jacketed as at $f^6$ to receive a heating medium to bring the chocolate to the desired temperature or, at this stage, to prevent chilling and graining thereof. The action of the worm within the tube stirs the chocolate and tends to maintain it at a uniform temperature throughout. The chocolate delivered from the elevator $f^4$ may be fed direct to the flooding trough $c$ shown as similar to that of Fig. 2 or may be delivered into a jacketed tank or hopper $f^7$ in which it may be stirred and maintained at or brought to the temperature required for coating.

It may be desirable to cool down the chocolate to bring it to the correct temperature for applying to the goods, either by passing a cooling medium through the elevating worm jacket $f^6$ or through one of the other tempering jackets in the machine. If such cooling is effected rapidly the effect of the cooled jacket may be to produce a considerable amount of graining throughout the mass of chocolate. In order to remelt such grained chocolate and to ensure that there is substantially no graining in the chocolate fed to the flooding vessel $c$ it may be desirable to again pass the chocolate through one or more pairs of heated revolving rollers $f^8$ or other equivalent in hopper $f^7$ and from which it passes direct to the flooding vessel, two scrapers being shown at $f^9$ co-operating with said rollers to conduct the chocolate in two streams.

In both methods last described it is also desirable to rapidly tap or vibrate the container or distributing vessel $c$, or its equivalent, as the case may be, and such vibration may suitably be effected as by means of mounting the container on a pivoted bar or bars $j$ the free end of which is hooked to engage a rotatable ratchet or toothed wheel $j^1$, or by other suitable means. This vibration causes the chocolate to flow more readily, and the grained chocolate to break away and spread evenly into the surface layer of the curtain; also it removes imprisoned air from the chocolate and improves the quality of the resultant goods, besides assisting in obtaining a uniform condition of the coating on the goods, whereas if such vibration is not used the glossy surface of the finished goods may be streaky or broken.

In all the methods described, the centres or goods to be coated must be sufficiently warm to prevent the chocolate coating setting from within outwards, that is to say the centres should be of approximately the same temperature as is the interior stratum or layer of the coating; also the temperature of the room or place in which the coating operation takes place and that of the place in which the goods are kept while the covering of chocolate solidifies must be such that the grained surface layer or stratum controls the solidification of the chocolate covering so that it takes place commencing with the grained exterior layer or stratum and setting from the outside inwards.

The above described methods may be used in the multiple coating of confectionery, that is to say where the confections are given a plurality of coatings. In such case it is only necessary to apply the final coating by the method of the present invention in order to obtain the desired exterior gloss or lustre.

What we claim as our invention and desire to secure by Letters Patent of the United States is:—

1. A method of coating confectionery and like goods, consisting in depositing on the goods a curtain of coating substance one surface of which has been subjected to a positive cooling action before the curtain reaches the goods, to form a definite external stratum of such curtain in partly crystallized or "grained" condition, while keeping the goods themselves at a higher temperature than such stratum.

2. A method of coating confectionery and like goods, consisting in depositing on the goods a curtain of coating substance one surface of which has been subjected to a positive cooling action before the curtain reaches the goods, to form a definite external stratum of such curtain in partly crystallized or "grained" condition, while keeping the temperatures of the internal stratum of the curtain and of the goods themselves approximately equal and higher than the temperature of said external stratum.

3. A method of coating confectionery and like goods, consisting in depositing on the goods a curtain of coating substance, and chilling one surface of the curtain before it reaches the goods so as to form a definite external stratum of such curtain in partly crystallized or "grained" condition.

4. A method of coating confectionery and like goods, consisting in passing the goods under a descending curtain of coating substance comprising a partly crystallized or "grained" portion and a non-crystallized or ungrained portion, in such a way that the "grained" portion forms the external surface of the coating when applied to the goods.

5. A method of coating confectionery and like goods, consisting in passing the goods under a descending curtain of coating substance comprising definite strata of different temperatures, the stratum of lower temperature forming the external surface of the coating when applied to the goods.

6. A method of coating confectionery and like goods, consisting in passing the goods under a descending curtain of coating substance, and chilling one surface of the curtain before it reaches the goods so as to form a definite external stratum of such curtain in partly crystallized or "grained" condition.

7. A method of coating confectionery and like goods, consisting in bringing two different portions of the coating substance to different temperatures, discharging the two portions in a single descending curtain in which said portions constitute different definite strata, and passing the goods under said descending curtain in such a way that the cooler stratum forms the external surface of the coating when applied.

8. A method of coating confectionery and like goods, consisting in passing the goods under a descending curtain of coating substance to form a coating thereon, and treating one surface of the curtain to produce a definite external stratum of the coating in partly crystallized or "grained" condition.

In witness whereof we have signed this specification.

GEORGE RALPH BAKER.
JAMES WASHINGTON EPPS.
GEORGE WILLIAM PERKS.